US010323719B2

United States Patent
Matsuda et al.

(10) Patent No.: US 10,323,719 B2
(45) Date of Patent: Jun. 18, 2019

(54) PLANETARY GEAR ASSEMBLY, DRIVE UNIT INCLUDING THE PLANETARY GEAR ASSEMBLY, AND IMAGE FORMING APPARATUS INCLUDING THE DRIVE UNIT, AND INSTALLATION METHOD FOR PLANETARY GEAR ASSEMBLY

(71) Applicants: Hiromichi Matsuda, Kanagawa (JP); Katsuaki Miyawaki, Kanagawa (JP); Tetsuo Watanabe, Kanagawa (JP); Yasuhiro Maehata, Tokyo (JP); Keisuke Shimizu, Tokyo (JP)

(72) Inventors: Hiromichi Matsuda, Kanagawa (JP); Katsuaki Miyawaki, Kanagawa (JP); Tetsuo Watanabe, Kanagawa (JP); Yasuhiro Maehata, Tokyo (JP); Keisuke Shimizu, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 44 days.

(21) Appl. No.: 15/183,147

(22) Filed: Jun. 15, 2016

(65) Prior Publication Data
US 2016/0298730 A1    Oct. 13, 2016

Related U.S. Application Data

(62) Division of application No. 13/795,279, filed on Mar. 12, 2013.

(30) Foreign Application Priority Data

Apr. 3, 2012  (JP) ................................. 2012-085066

(51) Int. Cl.
*F16H 57/08*  (2006.01)
*F16H 1/28*  (2006.01)
(Continued)

(52) U.S. Cl.
CPC ............ *F16H 1/2827* (2013.01); *F16H 1/28* (2013.01); *F16H 1/46* (2013.01); *F16H 57/08* (2013.01);
(Continued)

(58) Field of Classification Search
None
See application file for complete search history.

(56) References Cited

U.S. PATENT DOCUMENTS 4,365,525 A * 12/1982 Imazaike ......... G11B 15/67571
192/20
4,491,037 A    1/1985 Bullock
(Continued)

FOREIGN PATENT DOCUMENTS

EP    2 390 104 A1    11/2011
JP    S34-019640    12/1959
(Continued)

OTHER PUBLICATIONS

Office Action for corresponding Japanese application No. 2012-085066 dated Sep. 18, 2015.
European Search Report dated Jul. 15, 2013.

*Primary Examiner* — Charles A Fox
*Assistant Examiner* — Ryan P Dodd
(74) *Attorney, Agent, or Firm* — Harness, Dickey & Pierce, P.L.C.

(57) ABSTRACT

A planetary gear mechanism includes a plurality of planetary gears, an outer gear, a sun gear, a carrier, and a stick mount. The outer gear meshes with the plurality of planetary gears. The sun gear is coaxially disposed on the same axis as the outer gear and transmits force to the planetary gears. The carrier rotatably supports the plurality of planetary gears and is rotatably and floatingly supported. The carrier includes a hole through which a stick member penetrates in a direction of axis of rotation of the carrier. The stick member penetrates (Continued)

through the hole and is mounted on the stick mount. The stick mount is disposed opposite the carrier. The outer gear and the sun gear are held such that one of the outer gear and the sun gear does not rotate.

8 Claims, 11 Drawing Sheets

(51) Int. Cl.
    *F16H 1/46*     (2006.01)
    *G03G 15/00*     (2006.01)
    *G03G 21/16*     (2006.01)
    *F16H 57/00*     (2012.01)

(52) U.S. Cl.
    CPC ......... *F16H 57/082* (2013.01); *G03G 15/757* (2013.01); *G03G 21/1647* (2013.01); *F16H 2057/0062* (2013.01); *Y10T 29/49464* (2015.01)

(56) References Cited

U.S. PATENT DOCUMENTS

| | | | |
|---|---|---|---|
| 4,799,564 A | 1/1989 | Iijima et al. | |
| 5,165,156 A * | 11/1992 | Shultz | B25B 9/00 |
| | | | 29/258 |
| 5,662,545 A * | 9/1997 | Zimmerman | B05B 3/0422 |
| | | | 29/893.1 |
| 6,938,316 B1 * | 9/2005 | Case | B25B 27/0035 |
| | | | 29/235 |
| 8,333,679 B2 * | 12/2012 | Richter | F01L 1/34 |
| | | | 475/331 |
| 2004/0067795 A1 | 4/2004 | Cydzik et al. | |
| 2004/0242365 A1 | 12/2004 | Uebbing | |
| 2006/0252596 A1 | 11/2006 | Abarquez et al. | |
| 2008/0145102 A1 | 6/2008 | Katoh et al. | |
| 2010/0323836 A1 | 12/2010 | Wang et al. | |
| 2011/0053730 A1 | 3/2011 | Fox et al. | |
| 2011/0068583 A1 | 3/2011 | Burkart | |
| 2011/0230305 A1 | 9/2011 | Miyawaki et al. | |
| 2011/0293328 A1 * | 12/2011 | Matsuda | B41J 23/025 |
| | | | 399/167 |
| 2012/0046142 A1 | 2/2012 | Miyawaki et al. | |
| 2014/0165403 A1 * | 6/2014 | Henkel | F16H 57/023 |
| | | | 29/893.2 |
| 2016/0298730 A1 * | 10/2016 | Matsuda | F16H 57/082 |

FOREIGN PATENT DOCUMENTS

| | | |
|---|---|---|
| JP | 2007-212806 A | 8/2007 |
| JP | 2008-151868 A | 7/2008 |
| JP | 2011-197298 A | 10/2011 |
| WO | WO-2004/055410 A1 | 7/2004 |

* cited by examiner

PLANETARY GEAR ASSEMBLY, DRIVE UNIT INCLUDING THE PLANETARY GEAR ASSEMBLY, AND IMAGE FORMING APPARATUS INCLUDING THE DRIVE UNIT, AND INSTALLATION METHOD FOR PLANETARY GEAR ASSEMBLY

CROSS-REFERENCE TO RELATED APPLICATIONS

This application is a divisional application of U.S. application Ser. No. 13/795,279, filed Mar. 12, 2013, which claims priority pursuant to 35 U.S.C. § 119 to Japanese Patent Application No. 2012-085066, filed on Apr. 3, 2012, in the Japan Patent Office, the entire disclosure of each of which is hereby incorporated by reference herein.

BACKGROUND

Field of the Invention

Exemplary embodiments generally relate to a planetary gear assembly, a drive unit including the planetary gear assembly, and an image forming apparatus including the drive unit, and a method for assembling the planetary gear assembly.

Description of the Related Art

Related-art image forming apparatuses, such as copiers, facsimile machines, printers, or multifunction printers having at least one of copying, printing, scanning, and facsimile capabilities, typically form an image on a recording medium according to image data. Thus, for example, a charger uniformly charges a surface of an image bearing member (which may, for example, be a photoconductive drum); an optical writer projects a light beam onto the charged surface of the image bearing member to form an electrostatic latent image on the image bearing member according to the image data; a developing device supplies toner to the electrostatic latent image formed on the image bearing member to render the electrostatic latent image visible as a toner image; the toner image is directly transferred from the image bearing member onto a recording medium or is indirectly transferred from the image bearing member onto a recording medium via an intermediate transfer member; a cleaning device then cleans the surface of the image carrier after the toner image is transferred from the image carrier onto the recording medium; finally, a fixing device applies heat and pressure to the recording medium bearing the unfixed toner image to fix the unfixed toner image on the recording medium, thus forming the image on the recording medium.

Known image forming apparatuses employ a planetary gear assembly to transmit power from a drive source to a target to be rotated, i.e., a rotary member such as a photosensitive member. An example of the planetary gear assembly includes a carrier that is rotatably and floatingly supported in an outer gear.

In such a configuration in which the carrier is floatingly supported, planetary gears may not properly mesh with the gear teeth of the outer gear or a sun gear, and tooth meshing errors occur. More specifically, the center tooth of the planetary gear meshing with the sun gear among other plurality of planetary gears is located at a position 180° away from the center tooth of the planetary gear meshing with the outer gear in the direction of rotation of the planetary gears. When assembled properly, the number of the center tooth of the planetary gear meshing with the sun gear is half the total number of gear teeth of the planetary gear when counting from the center tooth meshing with the outer gear. By contrast, when assembled improperly, that is, when the tooth meshing errors occur, the number of the center tooth of the planetary gear meshing with the sun gear is not half the total number of gear teeth of the planetary gear when counting from the center tooth of the planetary gear meshing with the outer gear.

When such tooth meshing errors occur, the carrier supporting the planetary gears is slightly tilted in the outer gear. In a case in which the carrier is supported by a shaft bearing in the outer gear, the outer circumferential surface of the carrier is fitted to the inner circumferential surface of the shaft bearing, and hence the carrier does not tilt in the outer gear. By contrast, when supporting the carrier floatingly, assembly of the gear is completed with the carrier being mounted obliquely. As a result, tooth meshing errors occur.

When the tooth meshing errors occur, the planetary gears receive uneven loads, hindering proper transmission of power, which results in various problems such as degradation of imaging quality, noise, and damage to devices.

SUMMARY

In view of the foregoing, in an aspect of this disclosure, there is provided an improved planetary gear mechanism including a plurality of planetary gears, an outer gear, a sun gear, a carrier, and a stick mount. The outer gear meshes with the plurality of planetary gears. The sun gear is coaxially disposed on the same axis as the outer gear and transmits force to the planetary gears. The carrier rotatably supports the plurality of planetary gears and is rotatably and floatingly supported. The carrier includes a hole through which a stick member penetrates in a direction of axis of rotation of the carrier. The stick member penetrates through the hole and is mounted on the stick mount. The stick mount is disposed opposite the carrier. The outer gear and the sun gear are held such that one of the outer gear and the sun gear does not rotate.

In another example embodiment, there is provided a method for assembling a planetary gear mechanism. The planetary gear mechanism includes a plurality of planetary gears, an outer gear, a sun gear, a carrier, and a stick mount. The outer gear meshes with the plurality of planetary gears. The sun gear is coaxially disposed on the same axis as the outer gear and transmits force to the planetary gears. The carrier rotatably supports the plurality of planetary gears and is rotatably and floatingly supported. The carrier includes a hole through which a stick member penetrates in a direction of axis of rotation of the carrier. The stick member penetrates through the hole and is mounted on the stick mount. The stick mount is disposed opposite the carrier. The outer gear and the sun gear are held such that one of the outer gear and the sun gear does not rotate. The method includes inserting the stick member to the hole of the carrier; mounting the stick member at the stick mount; meshing the plurality of planetary gears with the sun gear and the outer gear by moving the carrier along the stick member, to mount the carrier in the outer gear; and removing the stick member after carrier is mounted.

The aforementioned and other aspects, features and advantages would be more fully apparent from the following detailed description of illustrative embodiments, the accompanying drawings and the associated claims.

BRIEF DESCRIPTION OF THE DRAWINGS

A more complete appreciation of the disclosure and many of the attendant advantages thereof will be more readily obtained as the same becomes better understood by reference to the following detailed description of illustrative embodiments when considered in connection with the accompanying drawings, wherein.

DETAILED DESCRIPTION OF EXAMPLE EMBODIMENTS

Figure 1:
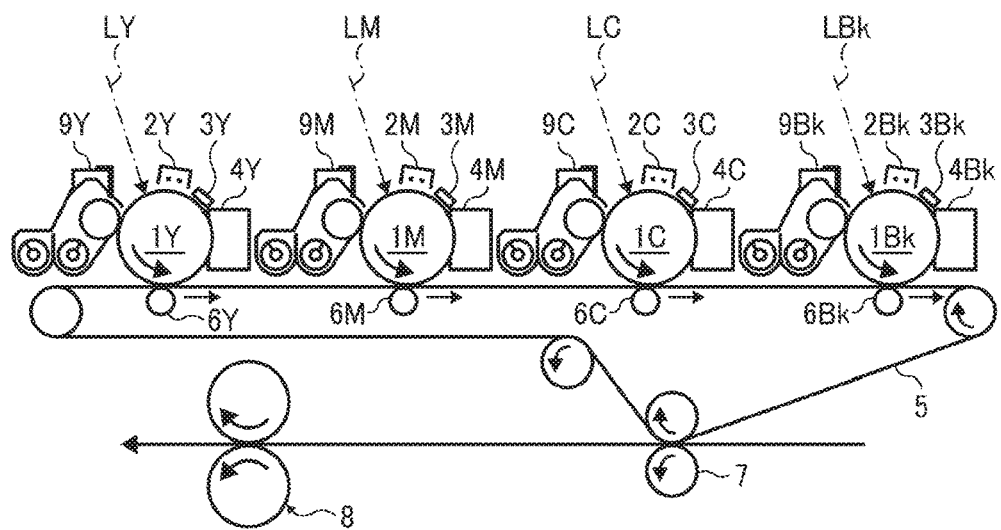
FIG. 1 is a schematic diagram illustrating a printer as an example of the image forming apparatus according to an example embodiment.

A description is now given of illustrative example embodiments. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of this disclosure.

In addition, it should be noted that the terminology used herein is for the purpose of describing particular embodiments only and is not intended to be limiting of this disclosure. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing illustrative embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In a later-described comparative example, illustrative embodiment, and alternative example, for the sake of simplicity, the same reference numerals will be given to constituent elements such as parts and materials having the same functions, and redundant descriptions thereof omitted.

Typically, but not necessarily, paper is the medium from which is made a sheet on which an image is to be formed. It should be noted, however, that other printable media are available in sheet form, and accordingly their use here is included. Thus, solely for simplicity, although this Detailed Description section refers to paper, sheets thereof, paper feeder, etc., it should be understood that the sheets, etc., are not limited only to paper, but include other printable media as well.

Referring now to the drawings, wherein like reference numerals designate identical or corresponding parts throughout the several views, and initially with reference to FIG. 1, a description is provided of an image forming apparatus according to an aspect of this disclosure.

A description is provided of an electrophotographic color copier as an example of an image forming apparatus. It is to be noted that the image forming apparatus according to the illustrative embodiment is a tandem-type image forming apparatus using a two-component, dry developing agent.

FIG. 1 is a schematic diagram illustrating a copier as an example of the image forming apparatus according to the illustrative embodiment of the present invention.

The image forming apparatus receives image data including image information from an image reading unit and performs image forming operation. As illustrated in FIG. 1, the image forming apparatus includes four photosensitive drums 1Y, 1M, 1C, and 1Bk each serving as a latent image bearing member, arranged in tandem along an intermediate transfer belt 5.

It is to be noted that the suffixes Y, M, C, and Bk denote colors yellow, magenta, cyan, and black, respectively. To simplify the description, the suffixes Y, M, C, and Bk indicating colors are omitted herein, unless otherwise specified.

The intermediate transfer belt 5 is formed into a loop and entrained around a plurality of rollers including a drive roller. The photosensitive drums 1Y, 1M, 1C, and 1Bk are arranged in tandem along the direction of movement of the intermediate transfer belt 5 and contact the intermediate transfer belt 5. The photosensitive drums 1Y, 1M, 1C, and 1Bk are surrounded by various imaging equipment. For example, charging devices 2Y, 2M, 2C, and 2Bk, developing devices 9Y, 9M, 9C, and 9Bk, cleaning devices 4Y, 4M, 4C, and 4Bk, and charge erasing lamps 3Y, 3M, 3C, and 3Bk are respectively provided around the photosensitive drums 1Y, 1M, 1C, and 1Bk in the order of electrophotographic process. The photosensitive drum 1, the charging device 2, the charge erasing lamp 3, the cleaning device 4, and the developing device 9 constitute a single integrated process cartridge detachably attachable relative to a main body of the image forming apparatus.

According to the illustrative embodiment, when forming a color image, the photosensitive drum 1Y is rotated in the direction indicated by an arrow by a photosensitive drum driving device described later and charged uniformly by the charging device 2Y while rotating. Subsequently, the photosensitive drum 1Y is illuminated with a light beam LY from an optical writing unit, thereby forming an electrostatic latent image corresponding to the color of yellow on the surface of the photosensitive drum 1Y. The electrostatic latent image of yellow on the photosensitive drum 1Y is developed with yellow toner by the developing device 9Y, thereby forming a visible image, also known as a toner image. Upon development, a predetermined developing bias is supplied between a developing roller of the developing device 9Y and the photosensitive drum 1Y so that the yellow toner on the developing roller is attracted electrostatically to the electrostatic latent image on the photosensitive drum 1Y.

Subsequently, as the photosensitive drum 1Y rotates, the toner image of yellow formed on the surface of the photosensitive drum 1Y arrives at a primary transfer position at which the photosensitive drum 1Y contacts the intermediate transfer belt 5. At the primary transfer position, the predetermined bias voltage is supplied to the rear surface of the intermediate transfer belt 5 by a primary transfer roller 6Y disposed inside the looped intermediate transfer belt 5, across from the photosensitive drum 1Y. Application of the bias voltage generates a primary transfer electric field which causes the yellow toner image on the photosensitive drum 1Y to move to the intermediate transfer belt 5. This process is known as primary transfer.

Similar to the toner image of yellow, toner images of magenta, cyan, and black are formed on the photosensitive drums 1M, 1C, and 1Bk, respectively, and transferred onto the intermediate transfer belt 5 such that they are superimposed one atop the other. Accordingly, a composite toner image is formed on the intermediate transfer belt 5.

Subsequently, the composite toner image formed on the intermediate transfer belt 5 is delivered to a secondary transfer position facing a secondary transfer roller 7, as the intermediate transfer belt 5 rotates. A transfer sheet such as a recording medium is fed to the secondary transfer position by a pair of registration rollers in appropriate timing such that the transfer sheet is aligned with the composite toner image formed on the intermediate transfer belt 5. At the secondary transfer position, the secondary transfer roller 7 supplies a predetermined bias voltage to the rear surface of the transfer sheet, thereby generating a secondary transfer electric field. The toner image on the intermediate transfer belt 5 is transferred onto the transfer sheet due to the secondary electric field and pressure applied at the secondary transfer position.

Subsequently, the transfer sheet, on which the composite toner image is secondarily transferred, is delivered between a pair of fixing rollers 8. The toner image is fixed onto the transfer sheet by heat and pressure applied by the pair of the fixing rollers 8 as the transfer sheet passes between the fixing rollers 8. After the fixing process, the transfer sheet is output outside the image forming apparatus.

Figure 2:
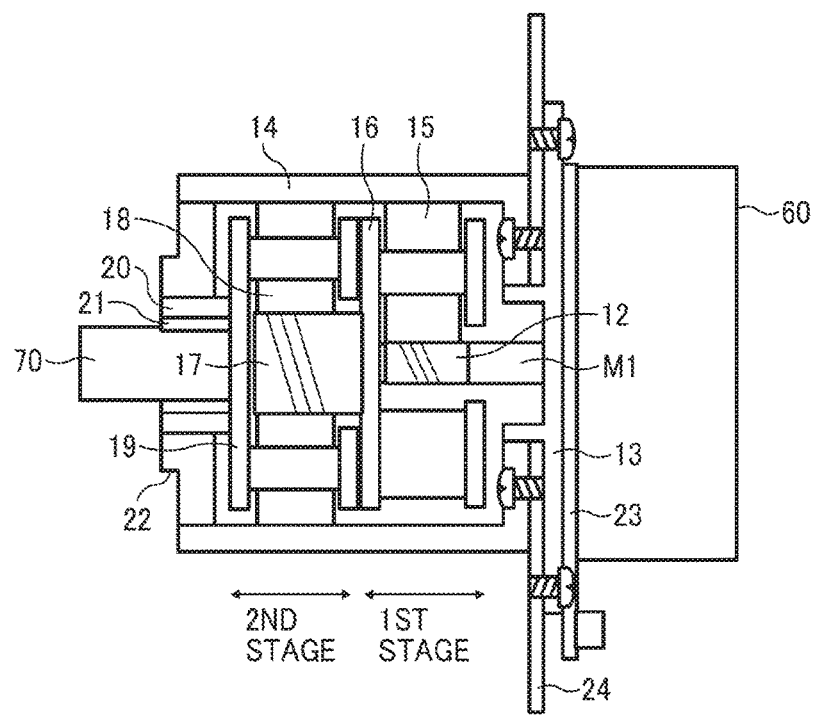
FIG. 2 is a cross-sectional view schematically illustrating a planetary gear mechanism for rotating a photosensitive drum employed in the image forming apparatus of FIG. 1.
Figure 3:
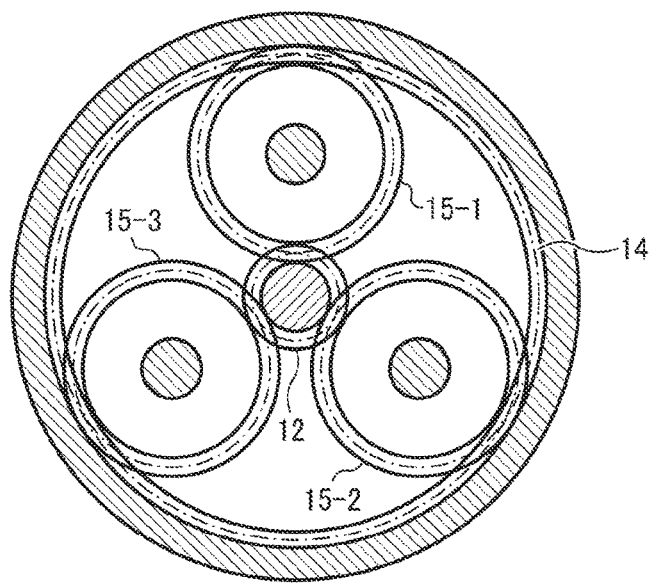
FIG. 3 is a cross-sectional view schematically illustrating a first stage of the planetary gear mechanism of FIG. 2.
Figure 4:
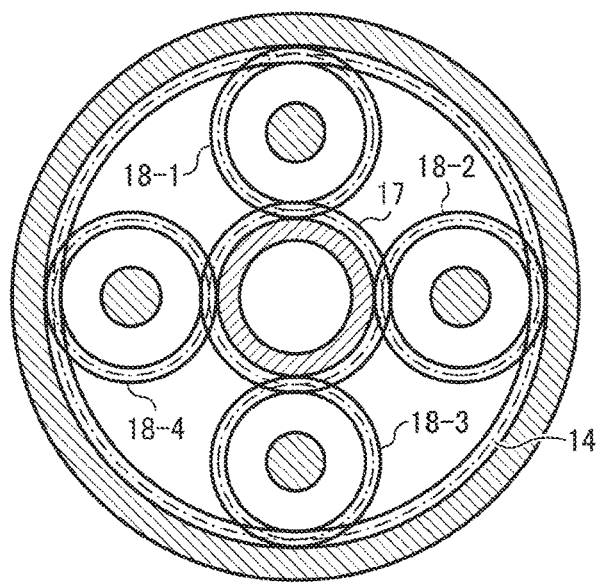
FIG. 4 is a cross-sectional view schematically illustrating a second stage of the planetary gear mechanism of FIG. 2.

With reference to FIGS. 2 through 4, a description is provided of a drive transmission unit that transmits rotary drive power from a motor 60 serving as a drive source to the photosensitive drums 1. FIG. 2 is a cross-sectional view schematically illustrating the drive transmission unit. FIG. 3 is a cross-sectional view schematically illustrating a first stage of a planetary gear mechanism of the drive transmission unit. FIG. 4 is a cross-sectional view schematically illustrating a second stage of the planetary gear mechanism.

A planetary gear decelerator employed in the drive transmission unit illustrated in FIG. 2 employs a two-stage 2-H type planetary gear mechanism. The planetary gear decelerator can be used in the drive transmission unit for the driving roller of the intermediate transfer belt 5, the fixing roller, and so forth.

In the image forming apparatus, when the planetary gear mechanism is employed as the drive transmission unit for the photosensitive drum having a diameter approximately in a range of from 30 mm to 100 mm, which is a typical photosensitive drum, a deceleration ratio of approximately $\frac{1}{20}$ is required. According to the present illustrative embodiment, such a relatively large deceleration ratio can be achieved by using the two-stage 2-H type planetary gear mechanism described above as the drive transmission unit.

With reference to FIG. 2, a description is provided of the planetary gear mechanism according to an illustrative embodiment of the present invention. As illustrated in FIG. 2, the planetary gear mechanism includes a first sun gear 12 integrally formed on a rotary shaft M1 of the motor 60, a gear mount 24 such as a flange, an outer gear 14, first planetary gears 15 of a first stage, a first carrier 16 of the first stage, and so forth. The outer gear 14 is fixed to the gear mount 24. The first planetary gears 15 mesh with the first sun gear 12 and the outer gear 14 fixed to the gear mount 24. The first planetary gears 15 are supported by the first carrier 16 and revolve around the periphery of the sun gear 12. According to the present illustrative embodiment, as illustrated in FIG. 3, at least three first planetary gears 15-1, 15-2, and 15-3 (collectively referred to as first planetary gears 15) are concentrically disposed for rotation balance and load dispersal. The first planetary gears 15-1, 15-2, and 15-3 are disposed at each of three positions of an evenly divided circumference.

The number of planetary gears is not limited to three. More than three planetary gears can be used.

The plurality of first planetary gears 15 meshes with the first sun gear 12 and the outer gear 14 so that each of the first planetary gears 15 rotates while revolving around the first sun gear 12. The first carrier 16 supporting the first planetary gears 15 rotates slower than the first sun gear 12, thereby obtaining the desired deceleration ratio of the first stage.

A second sun gear 17 serves as a sun gear for the second stage and as an input for the second stage of the deceleration mechanism. The second sun gear 17 is provided at the center of rotation of the first carrier 16. It is to be noted that the first carrier 16 does not include a rotary supporting portion, thereby allowing the first carrier 16 to float (rotate) freely.

Similar to the first planetary gears 15, a plurality of second planetary gears 18-1, 18-2, 18-3, and 18-4 (collectively referred to as second planetary gears 18) serving as planetary gears for the second stage meshes with the outer gear 14 and is supported by a second carrier 19 of the second stage. The outer gear of the first stage and the outer gear of the second stage are constituted as a single integrated unit as the outer gear 14. The plurality of second planetary gears 18 revolves around the periphery of the second sun gear 17. According to the present illustrative embodiment, as illustrated in FIG. 4, the second planetary gears 18-1, 18-2, 18-3, and 18-4 are disposed at each of four positions of an evenly divided circumference.

Alternatively, similar to the first stage, the plurality of the second planetary gears 18 may be concentrically and evenly disposed at each of three positions. The second carrier 19 of the second stage which is the last stage is provided with an output portion including a cylindrical-shaped shaft 20 serving as an output axis, the inner surface of which includes spline teeth. The gear of the second stage directly receives the rotational load of the cylindrical-shaped shaft 20. In order to enhance durability, as illustrated in FIG. 4, the number of planetary gears provided to the second stage, that is, the number of the second planetary gears 18, is greater than the number of the first planetary gears provided to the first stage.

As will be described later, a drum shaft 70 penetrates through the process cartridge to support the photosensitive drum 1. The drum shaft 70 includes a spline portion 21 serving as an output portion having spline teeth on an outer surface thereof to mesh with the inner teeth (spline teeth) of the cylindrical-shaped shaft 20.

According to the above-described illustrative embodiment, a set of four kinds of parts, the sun gear, the planetary gear, the planetary carrier for supporting revolution of the planetary gears, and the outer gear, constitutes the 2-H type planetary gear mechanism.

One of three elements of rotation, that is, one of rotation of the sun gear, revolution of the planetary gear (rotation of the carrier), and rotation of the outer gear, is fixed, and remaining two gears are each connected to the input and the output. With this configuration, the deceleration ratio and the direction of rotation can be switched between different deceleration ratios and directions of rotation depending on designation of each element, that is, according to which gear is fixed and which gear is connected to the input or the output.

The two-stage 2K-H type planetary gear mechanism is classified as a composite planetary gear mechanism including at least two sets of 2K-H type planetary gear mechanisms. In the composite planetary gear mechanism, among three elements, the gears having the same element are either connected or fixed. The remaining two elements are each connected to the input and the output.

The planetary gear mechanism of the illustrative embodiment is a planetary type mechanism in which the outer gear is fixed, the sun gear serves as the input axis, and the carrier serves as the output axis. The direction of rotation of the input axis is the same as that of the output axis.

More specifically, power from the motor 60 is transmitted from the motor shaft M1 to the first sun gear 12, thereby rotating the first sun gear 12. Due to rotation of the first sun gear 12, three first planetary gears 15-1, 15-2, and 15-3 engaging the first sun gear 12 themselves rotate while revolving around the first sun gear 12. Due to revolution of the first planetary gears 15-1, 15-2, and 15-3 around the first sun gear 12, a decelerated driving force is transmitted to the first carrier 16, thereby rotating the first carrier 16 and hence causing the second sun gear 17 provided to the first carrier 16 to rotate. Subsequently, power is transmitted to the four second planetary gears 18-1, 18-2, 18-3, and 18-4 engaging the second sun gear 17. Accordingly, the second planetary gears 18-1, 18-2, 18-3, and 18-4 themselves rotate while revolving around the second sun gear 17. Due to revolution of the second planetary gears 18-1, 18-2, 18-3, and 18-4, the driving force is decelerated and transmitted to the second carrier 19 and then to the photosensitive drum 1 via the cylindrical-shaped shaft 20 and the drum shaft 70 provided to the second carrier 19. Accordingly, the photosensitive drum 1 is rotated at a predetermined speed.

The deceleration ratio of a single-stage planetary gear mechanism is expressed by the following equation:

Deceleration Ratio=$Za1/(Za1+Zc1)$, where Za is a number of teeth of the sun gear, Zb is a number of teeth of the planetary gear, and Zc is a number of teeth of the outer gear. In the equation, "1" represents the first stage.

The deceleration ratio of a planetary gear mechanism having two stages is a product of the deceleration ratio of the first stage and that of the second stage. Both the first and the second stages of the planetary gear mechanism of the illustrative embodiment are the planetary type. Thus, the deceleration ratio is expressed by the following equation:

$$\text{Deceleration Ratio} = Za1/(Za1+Zc1) \times Za2/(Za2+Zc2)$$

In this equation, "1" represents the first stage and "2" represents the second stage.

It is to be noted that the rotary shaft M1 of the motor 60 is supported by a motor mount 13 via two shaft bearings. The motor mount 13 may be a flange.

By supporting the rotary shaft M1 of the motor 60, an outer rotor of a brush-less direct current (DC) motor is also supported. A stator core of the motor 60, a motor driving circuit, and so forth are also disposed on the motor mount 13.

The first sun gear 12 is formed on the rotary shaft M1 of the motor 60 by cutting. In order to secure coaxial accuracy of the shaft of the first sun gear 12 and the shaft of the outer gear 14, the outer gear 14 and the motor mount 13 are positioned in place by being fitted together. Furthermore, the motor mount 13 is positioned in place by being fitted to the gear mount 24.

An end cap 22 is fixed to one end portion of the outer gear 14 opposite the motor mount 13. The end cap 22 is used to prevent the first planetary gears 15, the second planetary gears 18, the first carrier 16, the second carrier 19, and the cylindrical-shaped shaft 20 from falling off from the outer gear 14 when the planetary gear decelerator is mounted on a lateral plate 127 at the motor side. There is a clearance between the end cap 22 and the cylindrical-shaped shaft 20 of the second carrier 19. More specifically, the end cap 22 does not rotatably support the second carrier 19 but instead allows the second carrier 19 to float (rotate) freely.

Figure 5:
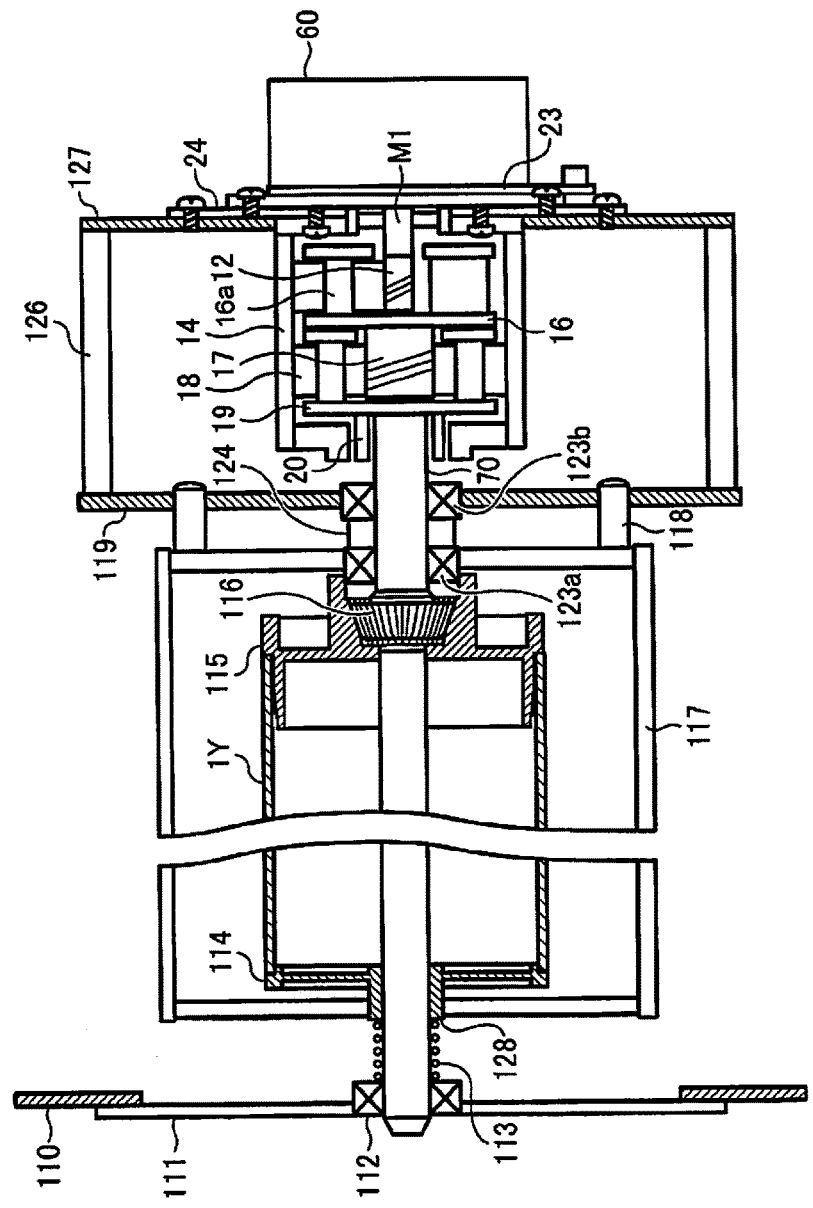
FIG. 5 is a schematic diagram illustrating the planetary gear mechanism and a supporting structure for the photosensitive drum in a process cartridge.

With reference to FIG. 5, a description is provided of support of the photosensitive drum 1 in the process cartridge detachably attachable relative to the main body of the image forming apparatus. FIG. 5 is a cross-sectional view schematically illustrating the photosensitive drum 1Y as a representative example of the photosensitive drums and the planetary gear decelerator supporting the photosensitive drum according to the illustrative embodiment of the present invention.

It is to be noted that the photosensitive drums 1Y, 1M, 1C, and 1Bk all have the same configuration as all the others, differing only in the color of toner employed. Thus, the description is only provided of a driving device for the photosensitive drum 1Y. The driving device may be applied to the driving roller of the intermediate transfer belt 5, the fixing roller, and so forth.

As illustrated in FIG. 5, a rear drum flange 115 and a front drum flange 114 are fixed to each end portion of the photosensitive drum 1Y in the axial direction thereof. The drum shaft 70 disposed at the main body side penetrates through the rear drum flange 115 and the front drum flange 114 so that the flanges 114 and 115 are supported by the drum shaft 70. The rear drum flange 115 is connected to the drum shaft 70 by a serration coupling 116. The photosensitive drum 1Y rotates in sync with rotation of the drum shaft 70. The serration coupling 116 has a male end at the drum shaft side and a female end at the drum flange side (the rear drum flange 115). The serration coupling 116 tapers toward the drum flange 115.

A housing 117 that supports the photosensitive drum 1Y houses the photosensitive drum 1Y, the charging device 2Y, the developing device 9Y, the cleaning device 4Y, and the charge erasing lamp (not illustrated), and so forth. As illustrated in FIG. 5, the rear side (right side in FIG. 5) of the housing 117 is supported by a shaft bearing 123a which is one of the shaft bearings 123a and 123b (collectively referred to as shaft bearings 123) fixed to the drum shaft 70 interposing a collar 124 therebetween. The rear drum flange 115 is also supported by the shaft bearing 123a. In this configuration, the rear side of the housing 117 and the rear drum flange 115 are supported by the shaft bearing 123a so that the photosensitive drum 1Y is aligned with the housing 117. The front drum flange 114 includes a boss 128 rotatably fitted with the housing 117 at the front side thereof (left side in FIG. 5).

The shaft bearing 123b is provided to the drum shaft 70 at the place at which the drum shaft 70 is fitted to a main-body rear lateral plate 119. Accordingly, the drum shaft 70 is aligned with the rear lateral plate 119. A main-body front lateral plate 110 includes a notch at which a face plate 111 is fixed. The front end of the drum shaft 70 is rotatably supported by the face plate 111 via a shaft bearing 112.

The process cartridge can be detached by removing the face plate 111. In an installed state in which the process cartridge is mounted, the photosensitive drum 1Y is pressed in the direction of the drum shaft by a pressing spring 113 disposed between the shaft bearing 112 fixed to the face plate 111 and the boss 128 of the front drum flange 114. Accordingly, the rotation direction and the thrust direction of the photosensitive drum 1Y are positioned in place at the tapered serration coupling 116. The housing 117 includes two positioning pins 118 at the rear side thereof. The positioning pins 118 are fitted into holes formed in the main-body rear lateral plate 119 so that the process cartridge in the direction of rotation is positioned in place.

Still referring to FIG. 5, a description is provided of installation of the planetary gear mechanism.

The lateral plate 127 of the motor side is attached to the main-body rear lateral plate 119 via studs 126. The gear mount 24 that supports the planetary gear mechanism is fixed to the lateral plate 127 at the motor side. The planetary gear mechanism is positioned in place by fitting the outer gear 14 into a hole formed in the lateral plate 127. Alternatively, the planetary gear mechanism is installed such that the lateral plate 127 serves also as the gear mount 24. As the planetary gear mechanism is attached to the lateral plate 127 at the motor side, the output side of the outer gear 14 becomes free and therefore easily deformed. Alternatively, the outer gear 14 may be fixed to the motor mount 13 without the gear mount 24.

Precise control of rotation speed of the photosensitive drum 1 and the intermediate transfer belt 5 is required. More specifically, the photosensitive drum 1 and the intermediate transfer belt 5 are rotated at a precise constant speed. If the speed of rotation of the photosensitive drum 1 and the intermediate transfer belt 5 fluctuates, imaging failure such as jitter and unevenness of image density occurs. Furthermore, if the rotation speed continues to fluctuate at a certain frequency, unevenness of image density appears periodically over the entire image as banding or stripes on an output image.

Fluctuation of the rotation speed of the photosensitive drum 1 in particular causes an optical writing system sub-scanning exposure misalignment. At the same time, the fluctuation of the rotation speed of the photosensitive drum 1 causes deviation of the sub-scanning position on the intermediate transfer belt 5 at primary transfer. Fluctuation of the rotation speed of the intermediate transfer belt 5 in return causes deviation of sub-scanning position both at the primary transfer and the secondary transfer. The banding derived from such fluctuation of the rotation speed degrades imaging quality significantly.

An allowable range of speed fluctuation based on banding of an image is equal to or less than approximately ±0.3% Peak-to-Peak in a bandwidth between 0 and 200 Hz to achieve precise operation, which is higher by one digit than a known planetary gear decelerator for a positioning purpose. In view of the above, a module of each gear constituting the planetary gear mechanism is 0.3 (approximately 0.9 mm for one tooth pitch). In this configuration, a gear mesh frequency can be 200 Hz or higher, thereby making the speed fluctuation of the gear mesh frequency within the allowable range.

As a high-precision gear with a small gear module such as 0.3 and 0.4, a plastic gear manufactured by injecting a molten resin into a mold is used. As compared with a metal gear, the plastic gear itself has lubricating properties, hence generating less noise during operation, and it is lightweight. Furthermore, the plastic gear is highly resistant to corrosion and easy to mass-produce.

Although advantageous, the plastic gear has some disadvantages in terms of its durability, stiffness, and tolerances. Thus, as will be described in detail later, according to the illustrative embodiment, the planetary gear decelerator is used to enhance durability and stiffness of the drive transmission unit using the plastic gear. More specifically, the planetary gear mechanism can increase durability and stiffness of the drive transmission unit because output shaft rotational road is dispersed and transmitted by a plurality of planetary gears. Furthermore, employing the planetary gear mechanism as the drive transmission unit can reduce gear size compared with a gear assembly using a gear train.

Figure 6:
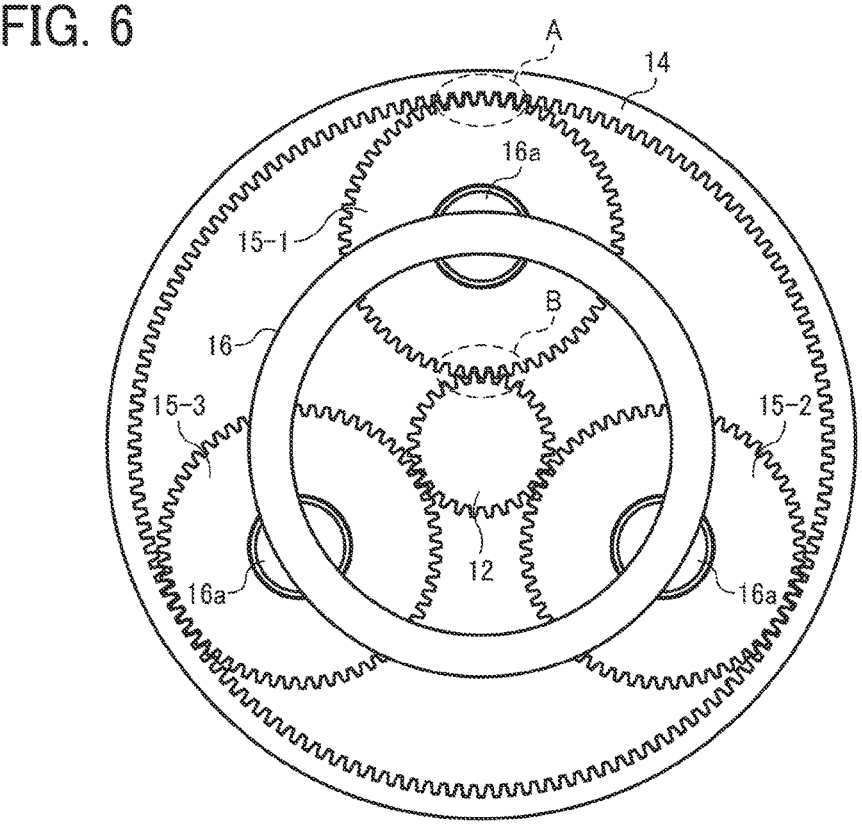
FIG. 6 is a diagram illustrating an example of a design of a planetary gear mechanism.

FIG. 6 is a diagram illustrating an example of a design of the planetary gear of the present illustrative embodiment.

The first sun gear 12 is formed on the motor shaft at the center of the outer gear 14 which is unrotatably held. The first planetary gears 15-1, 15-2 and 15-3 are disposed at each of three positions equally spaced around the first sun gear 12. Each of the first planetary gears 15-1, 15-2, and 15-3 is rotatably supported by a carrier pin 16a fixed to the carrier 16.

Due to rotation of the first sun gear 12, the first planetary gears 15-1, 15-2, and 15-3 engaging the first sun gear 12 themselves rotate while revolving around the first sun gear 12. Revolution of the first planetary gears 15-1, 15-2, and 15-3 is output by the carrier 16. According to the present illustrative embodiment shown in FIG. 6, the number of teeth Za of the first sun gear 12 is 30 (Za=30), the number of teeth Zb of the first planetary gears 15-1, 15-2 and 15-3 is 60 (Zb=60), and the number of teeth Zc of the outer gear 14 is 150 (Zc=150), and the deceleration ratio is ⅙.

In the present illustrative embodiment, two planetary gear mechanisms having the same configuration described above are connected to constitute the planetary gear decelerator for driving the photosensitive drums as illustrated in FIG. 2. Downsizing and increased accuracy of the planetary gear decelerator can be achieved by employing the gear module of 0.3. A known single-stage gear decelerator uses a gear with a diameter of approximately 100 mm. By contrast, in the present illustrative embodiment, the pitch diameter of the outer gear 14 is approximately 45 mm which is approximately the same diameter as that of the photosensitive drum. In this configuration, interference with other parts is insignificant, and hence downsizing can be achieved.

In a standard image forming apparatus, when an image formation process linear velocity is 360 mm/sec and the diameter of the photosensitive drum is 60 mm, the number of rotations of the shaft of the photosensitive drum (the output shaft of the planetary gear mechanism) is 2 rotations per second. In this configuration, the number of teeth of the outer gear 14 is 150, and the planetary gear rotates twice per second while revolving. Accordingly, the mesh frequency is 300 Hz. In this configuration, visibility of banding in accordance with the mesh frequency is low and impact on the image quality is insignificant.

However, the planetary gear mechanism with the carrier supported floatingly and holding a small module gear, for example, a gear having the gear module of 0.4 (tooth pitch=approximately 1.3 mm) and 0.3 (tooth pitch=approximately 0.9 mm) is difficult to assemble.

For example, when the carrier holding the plurality of the planetary gears is mounted on the outer gear which has been assembled with the sun gear, it is necessary to make sure that the outer gear and the planetary gears, and the planetary gears and the sun gear mesh properly. In a case in which the small-module gear such as the one with the module of 0.4 (tooth pitch of approximately 1.3 mm) and 0.3 (tooth pitch of approximately 0.9 mm) is employed, if the carrier itself is inserted obliquely into the outer gear, the teeth of gears do not mesh properly, that is, tooth meshing errors occur.

Figure 7:
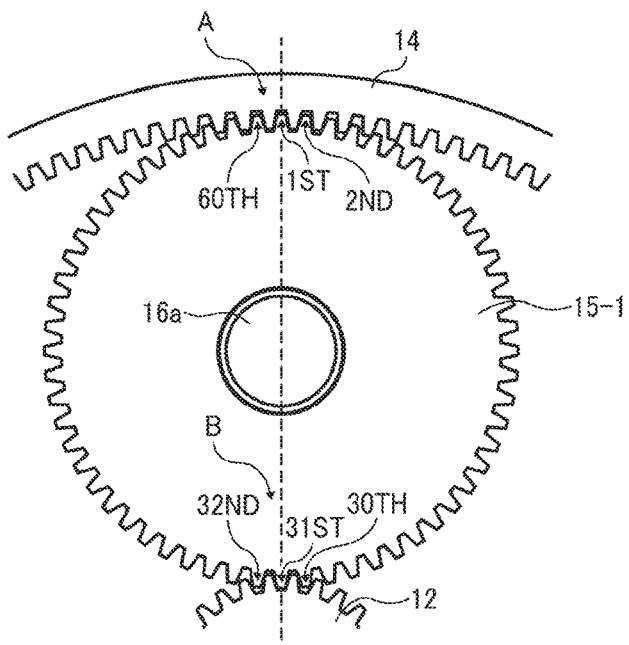
FIG. 7 is an enlarged diagram schematically illustrating a configuration near a first planetary gear.

With reference to FIG. 7, a description is provided of an example of tooth meshing errors of the first planetary gear 15-1.

FIG. 7 is an enlarged diagram schematically illustrating a configuration near the first planetary gear 15-1.

As illustrated in FIG. 7, the first planetary gear 15-1 meshes with the outer gear 14 at a mesh A (on a broken line) and meshes with the sun gear 12 at a mesh B (on a broken line). The mesh center of the mesh B is located precisely 180 degrees from the mesh center of the mesh A. More specifically, in a case in which the first planetary gear 15-1 meshes properly with the outer gear 14 at the mesh A and meshes properly with the sun gear 12 at the mesh B, when a tooth of the first planetary gear 15-1 (having 60 teeth) at the center of the mesh A on the broken line in FIG. 7 is presented as a first tooth (tooth 1) and each tooth is given a consecutive number in the clockwise direction, the tooth of the first planetary gear 15-1 at the mesh B on the broken line is the 31st tooth (tooth 31). However, tooth meshing errors occur due to various reasons. The tooth of the first planetary gear 15-1 to mesh with the tooth of the sun gear 12 may be the 30th tooth (tooth 30) or the 32nd tooth (tooth 32). In this case, the planetary gear 15-1 is displaced by one tooth relative to the sun gear 12. This tooth meshing error is hereinafter referred to as one-tooth shift.

Once assembled with one-tooth shift, the position of the planetary gear 15-1 cannot be corrected to a proper meshing position. In a case in which more than three planetary gears are employed as in the present illustrative embodiment, if the planetary gear 15-1 is assembled with one-tooth shift and other two planetary gears 15-2 and 15-3 are mounted properly, adjustment of only the planetary gear 15-1 by moving in the revolution direction cannot be performed because the carrier 16 restricts relative positions between the planetary gears.

Only the planetary gear 15-1 which is assembled with one-tooth shift receives or does not receive transmission load. If the planetary gear 15-1 does not receive transmission load, the planetary gear 15-1 becomes an idle gear. As a result, load is dispersed unevenly to each of the planetary gears. Furthermore, the opposite side of the meshing tooth of the planetary gear 15-1 meshes with the sun gear 12, causing significant irregular rotation and vibration. Furthermore, it results in degradation of durability. In the image forming apparatus, such a power transmission error causes various problems such as degradation of imaging quality, noise, and damage to the planetary gears.

There are four known causes that lead to improper assembly or the one-tooth shift of the planetary gears.

1. Amount of backlash (backlash between the outer gear and the planetary gear, between the planetary gear and the sun gear, a sum of two mesh portions).

2. Rattling of the planetary gear shaft (a clearance between an internal diameter of the planetary gear and a carrier pin)

3. Shape variations of parts (e.g., tooth profile deviations and displacement of shafts)

4. Inclination of a gear upon assembly (e.g., Inclination of the carrier holding the planetary gear)

In the present illustrative embodiment, each of the sun gear, the planetary gear, and the outer gear is made through injection molding with precision so that the causes 1 through 3 alone cannot cause the one-tooth shift. Therefore, it is understood that the one-tooth shift is mainly due to the inclination of a gear described below.

First, in a case in which each gear with the module of 0.3 is made with an accuracy grade of Japan Industrial Standard (hereinafter, JIS) 7 and JIS 8, the amount of backlash (i.e., the cause No. 1 described above) between the outer gear and the planetary gear is in a range of from approximately 70 μm to approximately 100 μm. The amount of backlash between the planetary gear and the sun gear is in a range of from approximately 50 μm and approximately 80 μm. The total amount of backlash is in a range of from approximately 120 μm and approximately 180 μm.

Next, as for the clearance of the shaft of the planetary gear (i.e., the cause No. 2), when the shaft bearing is made of resin having a relatively large mold variation, the shaft clearance of the planetary gear is in a range of from approximately 50 μm to 70 μm. In a case in which the planetary gear shifts towards one side relative to the shaft with the mesh-A side as a reference, the amount of shift at the mesh-B side is in a range of from approximately 100 μm to approximately 140 μm.

As for the shape variations of parts (i.e., the cause No. 3), due to cumulative pitch deviations and displacement of the carrier pin when using the gears with the module of 0.3 made with accuracy grade JIS 7 and JIS 8, the positional deviation at mesh positions is in a range of from approximately 80 μm to approximately 100 μm. In total, a deviation of 420 μm at maximum occurs at the mesh positions.

To produce the one-tooth shift, a deviation of one-tooth pitch (approximately 900 μm for Module 0.3) is required. Therefore, it is understood that the inclination of the gear (i.e., the cause No. 4) upon assembly is most likely the main reason for the one-tooth shift when a deviation of approximately 500 μm or greater occurs.

Figure 8:
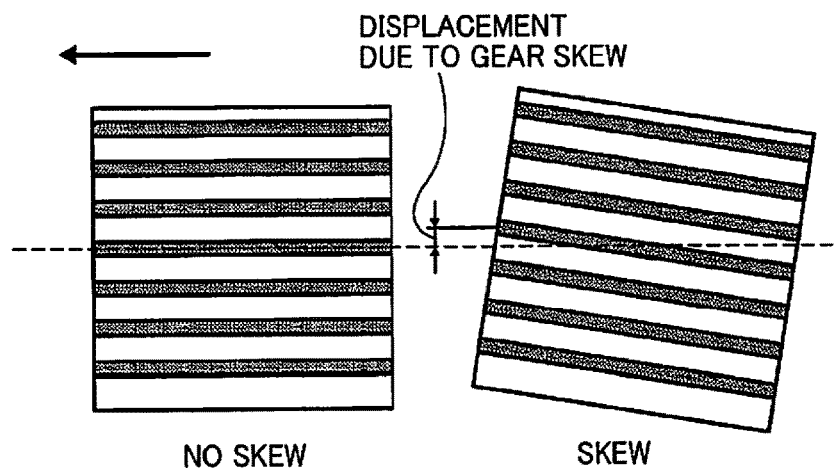
FIG. 8 is a schematic diagram illustrating inclination of the gear upon assembly.

With reference to FIG. 8, a description is provided of inclination of the gear, which is the main cause of the one-tooth shift upon assembly. FIG. 8 is a schematic diagram illustrating the inclination upon assembly.

As illustrated in FIG. 8, the position of the edge of teeth deviates in accordance with an amount of inclination when assembling the planetary gear 15 and the sun gear 12 by moving these gears in the direction of arrow. When the gears tilt upon assembly, the mesh position of the edge of the gear changes easily in accordance with the amount of inclination, resulting in the one-tooth shift.

In the present illustrative embodiment, the carrier 16 is supported floatingly. In a case in which the sun gear 12 is inserted into the fixed outer gear 14 to which the planetary gears 15 and the carrier 16 supporting the planetary gears 15 have been mounted, the carrier 16 tilts easily together with the planetary gears 15 because the carrier 16 is floatingly supported. In a case in which the carrier 16 supporting the planetary gears 15 is inserted to the fixed outer gear 14 to which the sun gear 12 has been mounted, because the shaft bearing is not provided to the carrier 16, the carrier 16 is inserted without its position being held in place. In other words, the position and the orientation of the carrier 16 are not determined, and hence the tilted carrier 16 is inserted, resulting in the one-tooth shift.

Figure 13:
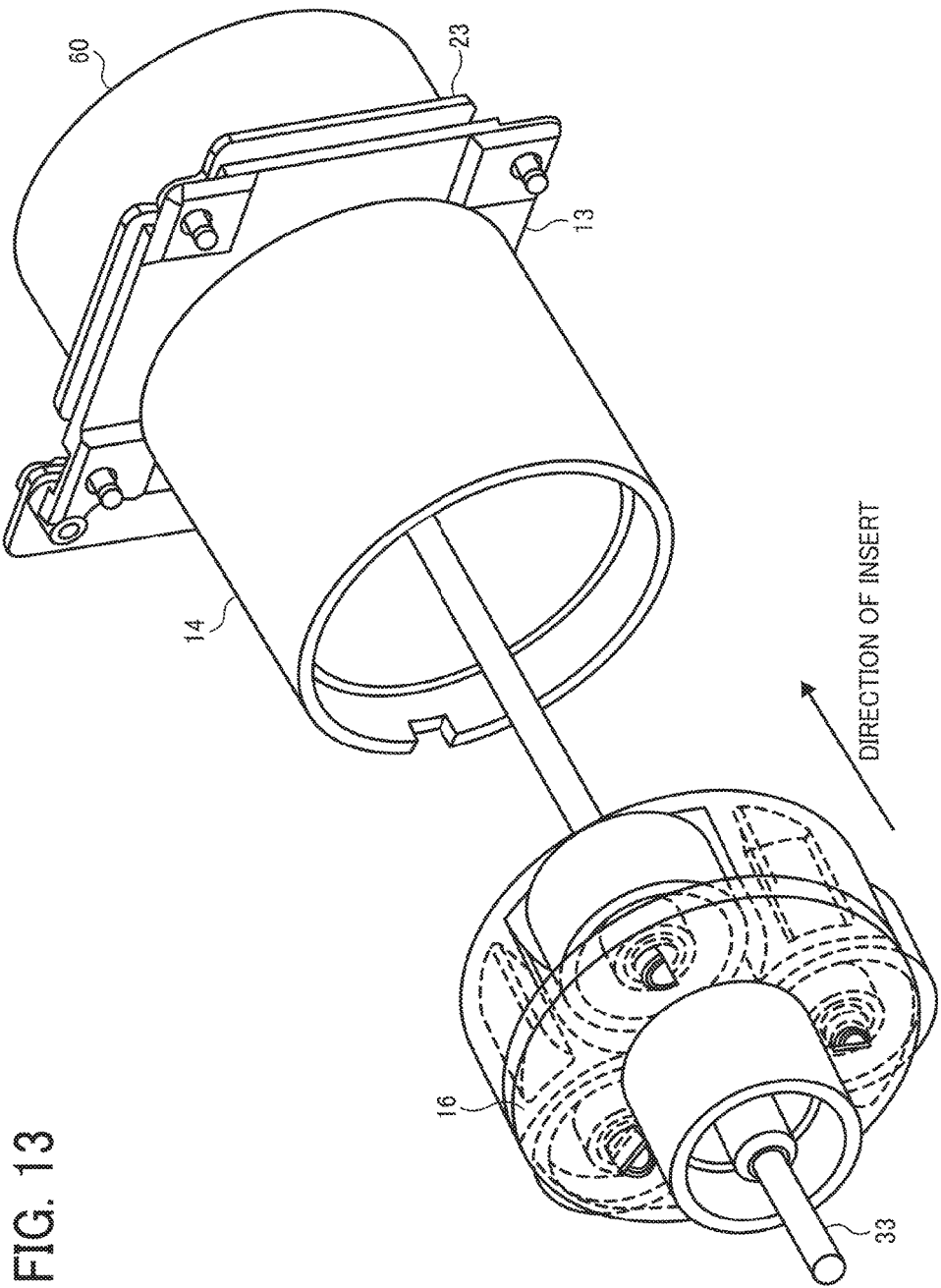
FIG. 13 is a perspective view schematically illustrating the first carrier mounted on an outer gear.

In view of the above, according to the illustrative embodiment, the carrier 16 is guided by a stick-type guide member 33 (hereinafter referred to simply as guide stick) as illustrated in FIG. 13 when the carrier 16 is mounted on the outer gear 14.

Figure 9:
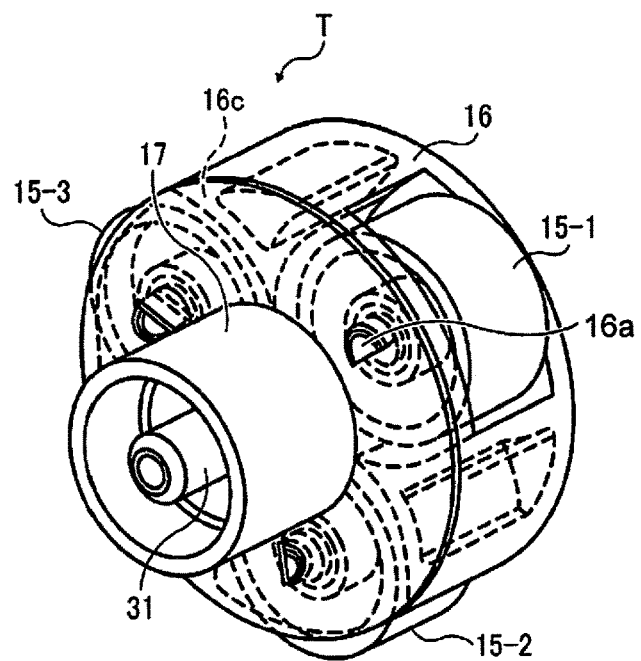
FIG. 9 is a perspective view schematically illustrating a first carrier and a second sun gear.
Figure 10:
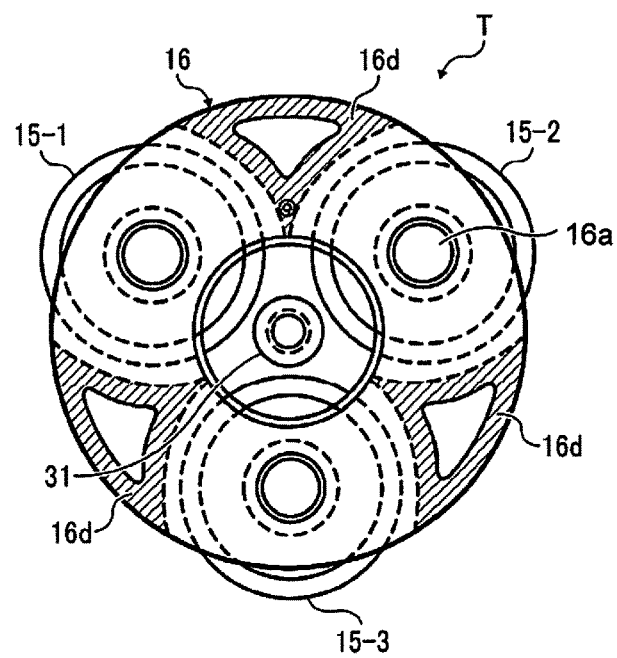
FIG. 10 is a front view schematically illustrating the first carrier as viewed from a first sun gear.
Figure 11:
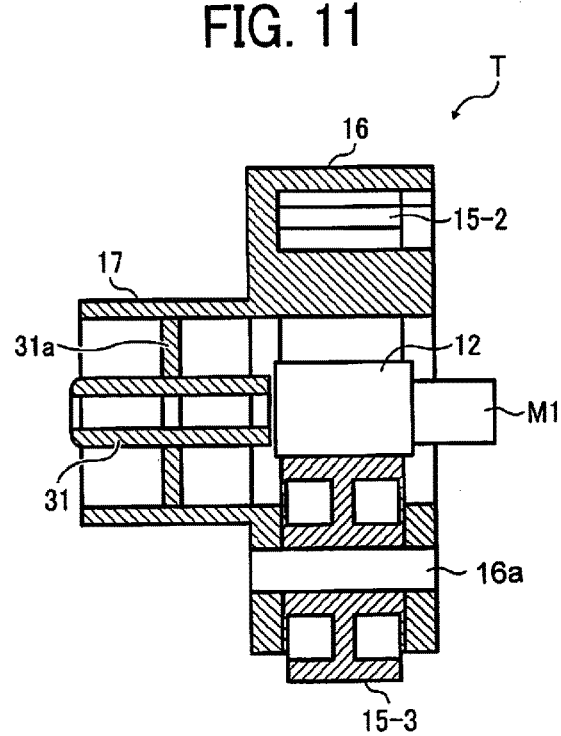
FIG. 11 is a cross-sectional view schematically illustrating the first carrier and the second sun gear.

FIG. 9 is a perspective view schematically illustrating the first carrier 16 and the second sun gear 17. FIG. 10 is an elevational view schematically illustrating the first carrier 16 as viewed from the first sun gear 12. FIG. 11 is a cross-sectional view schematically illustrating the first carrier 16 and the second sun gear 17.

According to the illustrative embodiment, the second sun gear 17 and the first carrier 16 are constituted as a single molded resin member through injection molding or the like. With this configuration, the center of rotation of the first carrier 16 and the center of rotation of the second sun gear 17 are coaxial, thereby securing coaxial accuracy and increasing transfer stiffness.

The first carrier 16 consists of two lateral plates 16c and three supports 16d disposed equally spaced around the circumference and between the lateral plates 16c, thereby connecting the lateral plates 16c. The first planetary gears 15-1, 15-2 and 15-3 are disposed between the supports 16d, and both ends of the carrier pin 16a supporting the planetary gear 15 are supported by the lateral plates 16c of the carrier 16. The lateral plates 16c include holes through which the carrier pins 16a are inserted. The first planetary gears 15-1, 15-2 and 15-3, and the first carrier 16 are assembled such that the first planetary gears 15 are disposed between the supports 16d and then the carrier pins 16a are inserted from the holes of one of the lateral plates 16c through the first planetary gears 15 into the holes of the other lateral plate 16c.

To facilitate assembly of the first planetary gears 15-1, 15-2 and 15-3 and the first carrier 16, the first carrier 16 may be constituted of two separable parts, that is, the lateral plate including the second sun gear 17 and the lateral plate at the first sun gear side. The lateral plate and the second sun gear 17 may be constituted as a single molded member. In this case, after one end of the carrier pin 16a constituted as a single integrated unit with the first sun gear 15 is fitted into the hole of one of the lateral plates 16c, the other end of the carrier pin 16a is fitted into the hole of the other lateral plate 16c, connecting the first and the second lateral plates via the supports 16d. Accordingly, the first planetary gears 15 and the first carrier 16 are assembled.

As illustrated in FIG. 9, a single integrated body T consisting of the second sun gear 17 and the first carrier 16 includes a tubular member 31 penetrating through the center of rotation of the single integrated body T. As illustrated in FIG. 11, the tubular member 31 is supported by the second sun gear 17 via a rib 31a. As will be described later in detail, the internal diameter of the tubular member 31 is slightly larger than the diameter of the guide stick 33 inserted thereto, thereby preventing the first carrier 16 from getting tilted (inclination in the direction of assembly of the first carrier 16) due to a gap between the guide stick 33 and the tubular member 31. The length of the tubular member 31 (the length in the horizontal (left-right) direction in FIG. 11) is equal to or greater than the tooth width of the second sun gear 17, thereby suppressing, if not preventing entirely the first carrier 16 from getting tilted due to a gap between the guide stick 33 and the tubular member 31. Furthermore, use of the guide stick 33 and the tubular member 31 upon assembly of the second carrier 19 can prevent inclination of the second sun gear 17.

Figure 12:
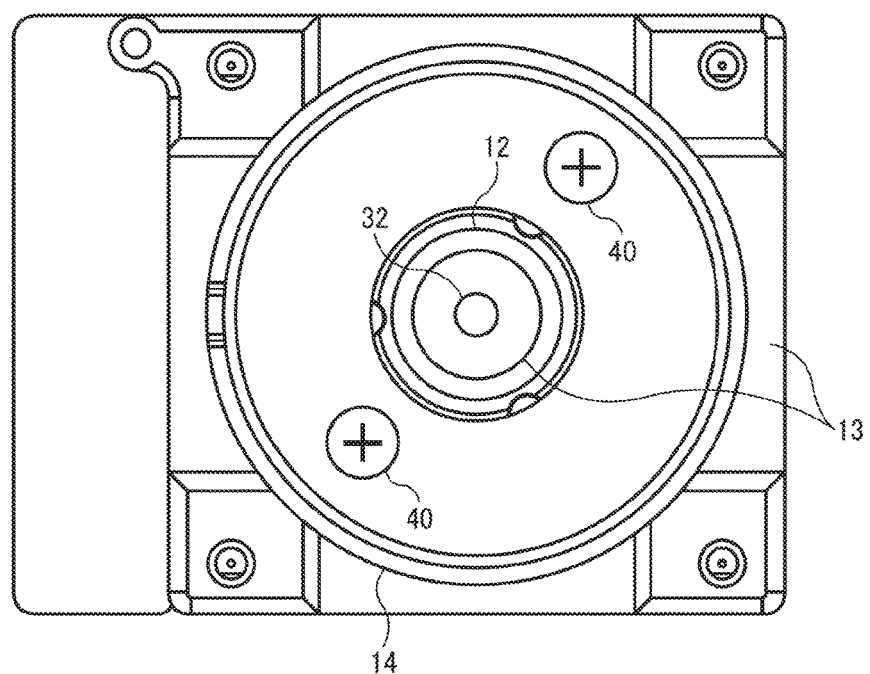
FIG. 12 is a front view schematically illustrating the first sun gear.

FIG. 12 is a front view schematically illustrating the first sun gear 12 according to the illustrative embodiment of the present invention.

As illustrated in FIG. 12, the center of rotation of the first sun gear 12 includes a guide positioning portion 32 including a conical concavity (also shown in FIG. 14) to which the guide stick 33 is fitted. In FIG. 12, the outer gear 14 is fixed to the motor mount 13. Alternatively, the outer gear 14 may be fixed to the gear mount 24.

Next, with reference to FIGS. 13 and 14, a description is provided of assembly of the first carrier 16 (the single integrated body T constituted of the first carrier 16 and the second sun gear 17).

Figure 14A:
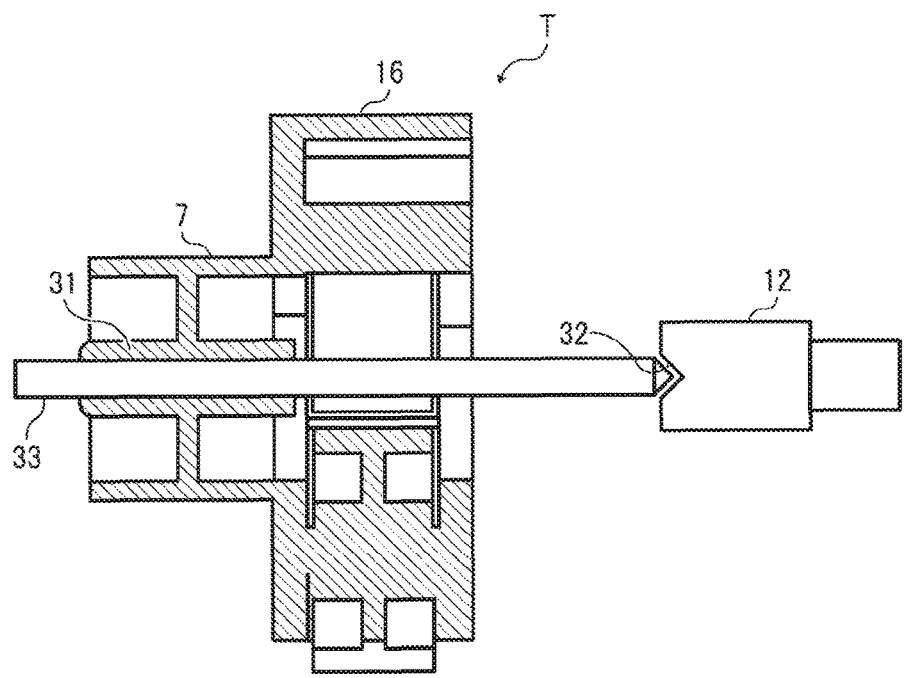
FIG. 14A is a cross-sectional view schematically illustrating a guide stick mounted on a positioning portion provided to the first sun gear.

FIG. 13 is a cross-sectional view schematically illustrating the first carrier 16 being mounted in the outer gear 14. FIG. 14A is a cross-sectional view schematically illustrating the guide stick 33 fitted to the positioning portion 32 of the first sun gear 12.

First, as illustrated in FIG. 12, the outer gear 14 is fixed to the motor mount 13 using screws 40. The first sun gear 12 is inserted to the through hole formed at the center of the motor mount 13. Subsequently, the motor 60 including the first sun gear 12 is screwed to the opposite side of the motor mount 13 to which the outer gear 14 is fixed as illustrated in FIG. 2.

Next, the motor mount 13 to which the first sun gear 12 and the outer gear 14 are fixed is set to a jig. Subsequently, as illustrated in FIG. 14A, the guide stick 33 is inserted through the tubular member 31 formed at the center of rotation of the first carrier 16 and the second sun gear 17. As illustrated in FIG. 14A, the guide stick 33 has a conical convex or pointed tip. The conical convex or pointed tip of the guide stick 33 penetrating through the first carrier 16 is mounted on the positioning portion 32 provided at the center of rotation of the first sun gear 12.

According to the present illustrative embodiment, as described above, the positioning portion 32 includes a conical concavity, and the guide stick 33 has a conical pointed tip. With this configuration, even if the tip of the guide stick 33 is out of the center of rotation of the first sun gear 12 when the guide stick 33 is mounted on the positioning portion 32, the tip of the guide stick 33 contacts an oblique surface of the positioning portion 32 which guides the tip of the guide stick 33 to the center of rotation of the sun gear 12. Accordingly, the conical pointed tip of the guide stick 33 is fitted reliably to the conical concavity of the positioning portion 32, and the tip of the guide stick 33 is positioned coaxially on the same rotation axis of the first sun gear 12. The opposed end of the guide stick 33 is supported by the jig such that the guide stick 33 is concentrically disposed on the same axis of the outer gear and the sun gear placed at the predetermined location of the jig.

In the configuration described above, the guide stick 33 which has been assembled together with the first carrier 16 is fitted to the positioning portion 32 of the first sun gear 12 so that the first carrier 16 and the first sun gear 12 are reliably positioned in place. Alternatively, after the guide stick 33 is positioned in place on the positioning portion 32, the first carrier 16 is assembled with the guide stick 33.

Figure 14B:
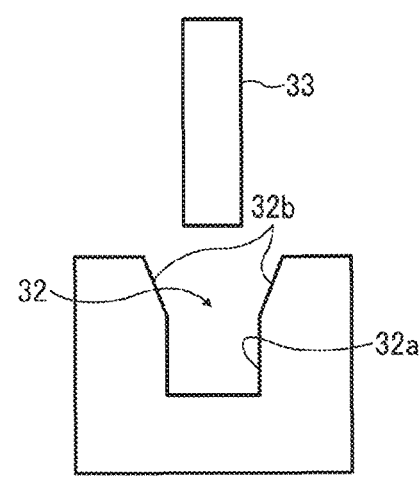
FIG. 14B is a cross-sectional view schematically illustrating a variation of the guide stick mounted on a positioning portion provided to the first sun gear.

According to the present illustrative embodiment, the positioning portion 32 includes a conical concavity, and the guide stick 33 includes a conical pointed tip that is fitted to the conical concavity of the positioning portion 32. The shapes of the positioning portion 32 and the guide stick 33 are not limited to this. Alternatively, as illustrated in FIG. 14B, the tip of the guide stick 33 has a planar surface, and the positioning portion 32 may have a circular concavity 32a in cross section having a similar or the same diameter as that of the guide stick 33. The tip of the guide stick 33 is fitted to the concavity 32a of the positioning portion 32. Similar to the foregoing embodiments, by forming a surface 32b of the positioning portion 32 at the carrier side oblique such that the internal diameter thereof decreases towards the concavity 32a or the sun gear side as illustrated in FIG. 14B, the oblique surface 32b of the positioning portion 32 guides reliably the tip of the guide stick 33 to the concavity 32a of the positioning portion 32.

After the guide stick 33 is positioned in place, the first carrier 16 is slidingly moved along the guide stick 33 to the first sun gear side, thereby inserting the first carrier 16 in the outer gear 14. The first planetary gears 15-1, 15-2 and 15-3 held by the first carrier 16 are meshed with the first sun gear 12 and the outer gear 14. According to the present illustrative embodiment, the outer gear 14 is common to the first and the second stages. Thus, the tooth width of the outer gear 14 is wider than that of the first sun gear 12. With this configuration, first, while the guide stick 33 regulates the position of the first carrier 16, the first planetary gears 15-1, 15-2 and 15-3 of the first carrier 16 inserted to the outer gear 14 mesh with the outer gear 14.

As the first carrier 16 with the first planetary gears 15-1, 15-2 and 15-3 meshing with the outer gear 14 is inserted further, the first planetary gears 15-1, 15-2 and 15-3 mesh with the first sun gear 12. At this time, the guide stick 33 regulates the position of first carrier 16 so as to be parallel to the shaft of the outer gear 14 and the first sun gear 12. With this configuration, the first planetary gears 15-1, 15-2 and 15-3 mesh with the first sun gear 12 properly without the one-tooth shift.

Preferably, the second carrier 19 is assembled in a similar manner as the first carrier 16. In this case, the cylindrical-shaped shaft 20 formed with the second carrier 19 as a single integrated member has spline teeth, and cylindrical internal spline teeth are formed on the drum shaft 70, which is a configuration in which a male coupling member and a female coupling member are reversed as compared with the configuration shown in FIG. 2. Accordingly, the cylinder portion that extends to the external teeth of the spline teeth is formed.

After the first carrier 16 is mounted, the guide stick 33 is inserted to the cylinder portion of the second carrier 19 and the second carrier 19 is slidingly moved to the outer gear 14 along the guide stick 33 while the guide stick 33 regulates the position of the second carrier 19. Accordingly, the second planetary gears 18-1, 18-2, 18-3, and 18-4 supported by the second carrier 19 mesh with the outer gear 14 and the second sun gear 17. At this time, the guide stick 33 regulates the position of second carrier 19 so as to be parallel to the shaft of the outer gear 14 and the second sun gear 17. With this configuration, the second planetary gears 18-1, 18-2, 18-3, and 18-4 mesh with the second sun gear 17 properly without one-tooth shift.

Preferably, the tooth width (the length in the direction of insert of the carrier) of the outer gear 14 extends beyond the tip portion of the tooth of the second sun gear 17. Similar to assembly of the first carrier 16, the planetary gears and the sun gear mesh after the outer gear 14 and the planetary gears mesh with each other. Furthermore, the gears can be assembled reliably and smoothly as compared with meshing the outer gear and the sun gear with the planetary gears simultaneously.

In a case in which the cylindrical-shaped shaft 20 including the internal spline teeth is formed on the second carrier 19, the portion of the second carrier 19 through which the guide stick 33 penetrates cannot have a cylinder shape, but it is a through-hole. Because the thickness of a plate member constituting the second carrier 19 is relatively thin, if there is a slight gap between the guide stick 33 and the through hole, the second carrier 19 is tilted. However, if the through hole has the same diameter as that of the guide stick 33 to eliminate the gap therebetween, the guide stick 33 does not move smoothly in the second carrier 19, hindering assembly of the second carrier 19.

Thus, in this case, preferably, the first carrier 16 and the second carrier 19 are assembled together using the guide stick 33. More specifically, after the first carrier 16 is inserted to the guide stick 33, the guide stick 33 is inserted to the through hole of the second carrier 19. Subsequently, the second carrier 19 is slidingly moved so that the second planetary gears 18-1, 18-2, 18-3, and 18-4 supported by the second carrier 19 mesh with the second sun gear 17 formed with the first carrier 16 as an integrated member. At this time, the center of the first carrier 16 and the center of the second carrier 19 are aligned by the guide stick 33, thereby allowing the second planetary gears 18-1, 18-2, 18-3, and 18-4 to mesh smoothly with the second sun gear 17. Similar to the foregoing embodiments as described above, the tip of the guide stick 33 is positioned on the positioning portion 32, and the other end of the guide stick 33 is positioned in place on the jig. Subsequently, the second planetary gears 18 mesh with the second sun gear 17, and in the state in which the first carrier 16 and the second carrier 19 are assembled, the first carrier 16 and the second carrier 19 are inserted to the outer gear 14.

As described above, the position of the first carrier 16 is regulated by the guide stick 33 and the tubular member 31, thereby allowing the first carrier 16 to be assembled without one-tooth shift. As for the second carrier 19, the second carrier 19 is assembled with the first carrier 16, and the second planetary gears 18 mesh with the second sun gear 17. In this configuration, the second carrier 19 is supported by the guide stick 33 inserted to the first carrier 16 and the through hole of the second carrier 19. Similar to the configuration with the tubular portion, the supported portion of the second carrier 19 supported by the guide stick 33 in direction of insert is long enough to prevent inclination of the second carrier 19 in the axial direction of the outer gear 14.

In view of the above, the cause of one-tooth shift of the secondary planetary gears 18 relative to the outer gear 14 includes backlash, rattling of shafts, and the shape variations. According to the present illustrative embodiment, the mesh error (positional error) upon assembly can be approximately 420 µm or less, which is less than the mesh error of approximately 900 µm (Module 0.3) that generates the one-tooth shift. The second carrier 19 can be assembled without the one-tooth shift.

According to the present illustrative embodiment, the first planetary gears 15 and the second planetary gears 18 are assembled properly without the one-tooth shift, thereby providing good transmission of rotation force and hence preventing degradation of imaging quality and noise. Furthermore, damage of the planetary gears is prevented.

Figure 15:
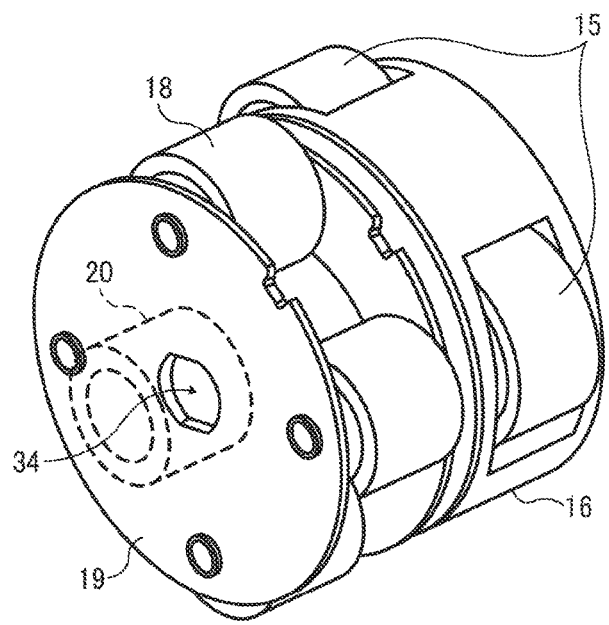
FIG. 15 is a perspective view schematically illustrating the first carrier and the second carrier of a first variation of the planetary gear mechanism.

With reference to FIG. 15, a description is provided of a variation of the illustrative embodiment of the present invention.

[VARIATION 1]

FIG. 15 is a perspective view schematically illustrating a first variation of the planetary gear mechanism.

In the first variation, as illustrated in FIG. 15, the tubular portion of the first carrier 16 through which the guide stick 33 penetrates and the shape of a through hole 34 of the second carrier 19 has a substantially oval shape with at least one corner, and the guide stick 33 has a substantially oval shape with at least one corner in cross-section. With this configuration, by rotating the guide stick 33, the first and the second carriers can be rotated.

When meshing the carriers with the outer gear and the sun gear, the mesh position of mating gear teeth can be found easily by rotating slightly the carriers themselves, thereby shortening assembly time. In the first variation, the guide stick 33 has a rounded rectangular shape in cross-section, and the hole of second carrier 19 and the tubular portion 31 of the first carrier 16 has also a rounded rectangular shape. By rotating the guide stick 33, the first and the second carriers are rotated, thereby shortening the assembly time.

According to the above example, the guide stick 33 has a substantially oval shape with at least one corner in cross-section, and the shape of the hole of second carrier 19 and the tubular portion 31 of the first carrier 16 has also an oval shape with at least one corner. However, the shape is not limited to a substantially oval shape with at least one corner. The shape may be elliptical, square, and noncircular.

[VARIATION 2]

Figure 16:
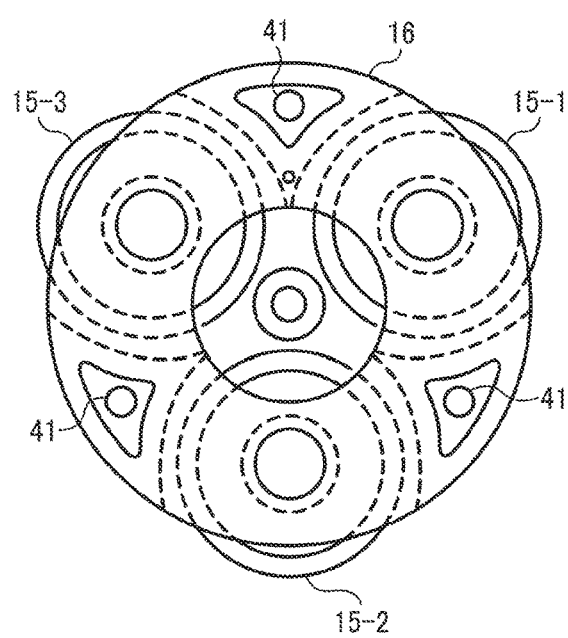
FIG. 16 is a front view schematically illustrating the first carrier of a second variation of the planetary gear mechanism as viewed from the first sun gear.
Figure 17:
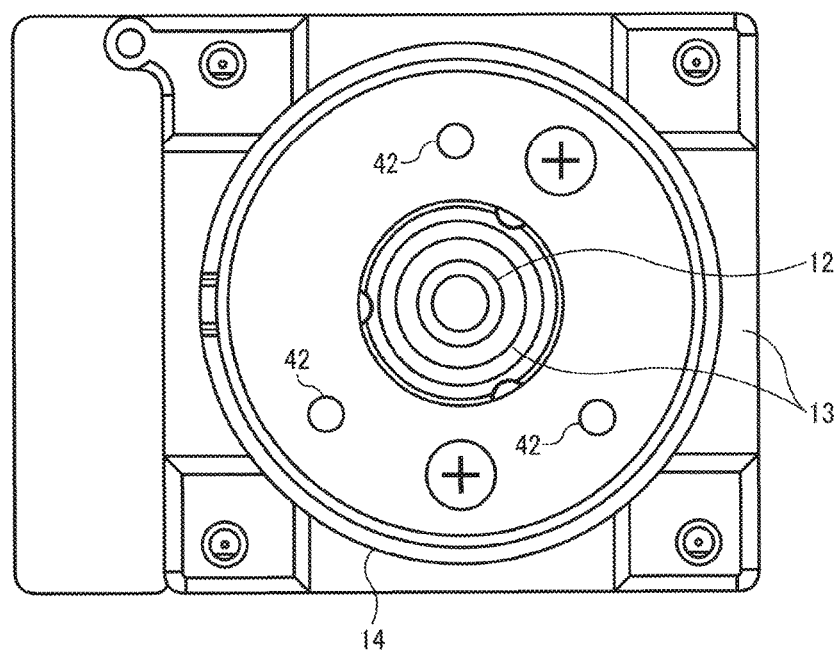
FIG. 17 is a front view schematically illustrating the first sun gear of the second variation of the planetary gear mechanism.

With reference to FIGS. 16 and 17, a description is provided of a second variation of the planetary gear mechanism. FIG. 16 is a front view schematically illustrating the first carrier 16 of the second variation of the planetary gear mechanism as viewed from the first sun gear 12. FIG. 17 is a front view schematically illustrating the first sun gear 12 of the second variation of the planetary gear mechanism. In the second variation, the planetary gear mechanism does not include the gear mount 24, and the outer gear 14 is fixed to the motor mount 13. However, the second variation is applicable to a configuration including the gear mount 24 to which the outer gear 14 is fixed.

In the second variation, as illustrated in FIG. 16, the first carrier 16 includes three through holes 41 provided equally spaced in the circumferential direction of the first carrier 16. The guide sticks 33 are inserted to the through holes 41. More specifically, the first carrier 16 is provided with three planetary gears 15, and the through holes 41 are provided between each of the planetary gears 15. As illustrated in FIG. 17, the bottom of the outer gear 14 or the motor mount 13 includes three positioning portions 42 at which the guide sticks 33 are positioned in place.

In the second variation, each of the guide sticks 33 is inserted to the through holes 41 and positioned in place at the positioning portions 42. The first carrier 16 is moved into the outer gear 14 while the position thereof is adjusted by the guide sticks 33 (in this example, three guide sticks 33), thereby mounting the first carrier 16 in the outer gear 14. With this configuration, a plurality of guide sticks 33 (in this example, three guide sticks 33) maintains the position of the first carrier 16 parallel to the axis of outer gear 14 and the first sun gear 12 when meshing the planetary gears 15-1, 15-2, and 15-3 with the outer gear 14 and the first sun gear 12. The teeth of the planetary gears 15-1, 15-2, and 15-3 can mesh with the proper mating teeth of the outer gear 14 and the first sun gear 12 without meshing errors such as the one-tooth shift.

In the second variation, three second planetary gears 18 are provided, and the second carrier 19 includes through holes. The through holes are formed in the second carrier 19 at the same position as the through holes in the first carrier 16. In this configuration, after installation of the first carrier 16, the second planetary gears 18 supported by the second carrier 19 can mesh with the second sun gear 17 and the outer gear 14 while the position of the second carrier 19 is adjusted by three guide sticks 33, similar to the first carrier 16.

In the second variation, the position of the first carrier 16 is adjusted by three guide sticks 33. With this configuration, even when the supported portion of the carrier supported by the guide stick 33 is not relatively long in the direction of insert of the guide stick 33, the carrier does not tilt relative to the direction of insert. Therefore, this configuration is effective when the carrier pin 16a is cantilevered by the carrier.

In the above example, the outer gear 14 is fixed. However, the present invention is not limited thereto. The present invention is applicable to a configuration in which the sun gear is fixed, and the carrier is floatingly supported. Similar to the foregoing embodiments, the planetary gears supported by the carrier can mesh with the outer gear and the sun gear without mesh errors while the position of carrier is adjusted by the guide sticks.

Although the embodiment of the present invention has been described above, the present invention is not limited to the foregoing embodiments, but a variety of modifications can naturally be made within the scope of the present invention.

According to an aspect of the disclosure, a planetary gear mechanism includes a plurality of planetary gears, an outer gear, a sun gear, a carrier, and a stick mount. The outer gear meshes with the plurality of planetary gears. The sun gear is coaxially disposed on the same axis as the outer gear and transmits force to the planetary gears. The carrier rotatably supports the plurality of planetary gears and is rotatably and floatingly supported. The carrier includes a hole through which a stick member penetrates in a direction of axis of rotation of the carrier. The stick member penetrates through the hole and is mounted on the stick mount. The stick mount is disposed opposite the carrier. The outer gear and the sun gear are held such that one of the outer gear and the sun gear does not rotate. With this configuration, the planetary gears held by the carrier mesh with the outer gear and the sun gear properly without one-tooth shift.

According to an aspect of the disclosure, in the planetary gear mechanism the hole of the carrier is formed at the center of rotation of the carrier, and the sun gear includes the stick mount on a plane facing the carrier in an axial center thereof. With this configuration, the planetary gears held by the carrier mesh with the outer gear and the sun gear properly without one-tooth shift while the stick member adjusts the position of the carrier.

According to an aspect of the disclosure, the planetary gear mechanism includes a mounting portion to which one of the sun gear and the outer gear is fixed. The mounting portion includes a plane facing the carrier. The carrier includes a plurality of the holes evenly disposed on a circumference of a lateral surface thereof. The mounting portion includes a plurality of the stick mounts on the plane facing the carrier. With this configuration, the planetary gears held by the carrier mesh with the outer gear and the sun gear properly without one-tooth shift while the stick member adjusts the position of the carrier.

According to an aspect of the disclosure, in the planetary gear mechanism a clearance is provided between the stick member and the hole, and the clearance does not allow the carrier to tilt relative to a direction of insert of the stick member. With this configuration, the stick member can regulate the position and orientation of the carrier.

According to an aspect of the disclosure, in the planetary gear mechanism one of the stick mount and the tip of the stick member includes a conical concavity, and another of the stick mount and the tip of the stick member has a conical convex shape. Accordingly, the tip of the stick member is reliably fitted to the stick mount. With this configuration, even when the tip of the stick member is offset from the center of rotation, the tip of the stick member is guided to the stick mount.

According to an aspect of the disclosure, the planetary gear mechanism includes a plurality of groups of the sun gear, the outer gear, the planetary gears, and the carrier. The plurality of groups is disposed in series in the axial direction. The outer gears have the same number of teeth, and are constituted as a single integrated member and fixed so as not to rotate. With this configuration, a large deceleration ratio can be obtained. The outer gears having the same number of teeth allow the carrier to be inserted therein while the position of the carrier is adjusted by the stick member.

According to an aspect of the disclosure, in the planetary gear mechanism the position of the hole in the carrier is the same for all groups. With this configuration, the stick member can be inserted to the carriers of different groups, and the carriers are inserted to the outer gear. Alternatively, the carriers are assembled on the stick member and then inserted to the outer gear.

According to an aspect of the disclosure, in the planetary gear mechanism the hole is formed at the center of rotation of the carrier, and the sun gear includes the stick mount on a plane facing the carrier in the axial center. The stick member has a noncircular shape in cross section, and the hole of the carrier has a noncircular shape to allow the stick member to fit therein. With this configuration, the carrier is rotated by rotating the stick member and mounted in the outer gear. Proper meshing positions of the planetary gears meshing with the sun gear and the outer gear can be found easily, thereby reducing assembly time.

According to an aspect of the disclosure, in the planetary gear mechanism the hole of the carrier has a tubular shape extending in the direction of insert of the stick member, thereby preventing the carrier from getting tilted due to the clearance between the stick member and the hole.

According to an aspect of the disclosure, a drive transmission unit includes a drive source, the planetary gear mechanism including an output shaft, and a shaft to support a target such as a photosensitive drum to be driven and transmit rotary force output from the output shaft of the planetary gear mechanism to the target. With this configuration, rotation force is properly transmitted and noise is prevented.

According to an aspect of the disclosure, an image forming apparatus includes a plurality of targets to be driven and the drive transmission unit to drive at least one of the plurality of targets. With this configuration, rotation force is properly transmitted and noise is prevented.

According to an aspect of the disclosure, a method for assembling a planetary gear mechanism includes inserting the stick member to the hole of the carrier; mounting the stick member at the stick mount; meshing the plurality of planetary gears with the sun gear and the outer gear by moving the carrier along the stick member, to mount the carrier in the outer gear; and removing the stick member after carrier is mounted.

According to an aspect of this disclosure, example embodiments are employed in the image forming apparatus. The image forming apparatus includes, but is not limited to, an electrophotographic image forming apparatus, a copier, a printer, a facsimile machine, and a multi-functional system. Furthermore, it is to be understood that elements and/or features of different illustrative embodiments may be combined with each other and/or substituted for each other within the scope of this disclosure and appended claims. In addition, the number of constituent elements, locations, shapes and so forth of the constituent elements are not limited to any of the structure for performing the methodology illustrated in the drawings.

Still further, any one of the above-described and other exemplary features may be embodied in the form of an apparatus, method, or system.

For example, any of the aforementioned methods may be embodied in the form of a system or device, including, but not limited to, any of the structure for performing the methodology illustrated in the drawings.

Example embodiments being thus described, it will be obvious that the same may be varied in many ways. Such exemplary variations are not to be regarded as a departure from the scope of the present invention, and all such modifications as would be obvious to one skilled in the art are intended to be included within the scope of the following claims.

What is claimed is:

1. A planetary gear mechanism, comprising:
   a plurality of first planetary gears;
   an outer gear to mesh with the plurality of first planetary gears;
   a first sun gear coaxially disposed on the same axis as the outer gear, to transmit force to the first planetary gears;
   a first carrier to rotatably support the plurality of first planetary gears, the first carrier rotatably supported and including a hole through which a stick member penetrates in a direction of axis of rotation of the first carrier; and
   a stick mount on which the stick member penetrating through the hole is mounted,
   wherein the outer gear is unrotatably held,
   wherein the hole is formed at the center of rotation of the first carrier, and the first sun gear includes the stick mount on a plane facing the first carrier in the axial center, and
   the stick member has a noncircular shape in cross section, and the hole of the first carrier has a noncircular shape to allow the stick member to fit therein.

2. The planetary gear mechanism according to claim 1, wherein the hole of the first carrier is formed at the center of rotation of the first carrier, and the first sun gear includes the stick mount on a plane facing the first carrier in an axial center of the first sun gear.

3. The planetary gear mechanism according to claim 1, further comprising a gear mount to which one of the sun gear and the outer gear is fixed, the gear mount including a plane facing the carrier,
   wherein the carrier includes a plurality of the holes evenly formed on a circumference of a lateral surface of the carrier,
   wherein the gear mount includes a plurality of the stick mounts on the plane facing the carrier.

4. The planetary gear mechanism according to claim 1, further comprising a plurality of second planetary gears, a second sun gear, and a second carrier,
   wherein the plurality of first planetary gears, the first sun gear and the first carrier comprise a first group and the plurality of second planetary gears, the second sun gear and the second carrier comprise a second group,
   wherein the first and second groups are disposed in series in an axial direction of the outer gear,
   wherein the first carrier and the second sun gear are constituted as a single integrated member common to each group.

5. The planetary gear mechanism according to claim 1, wherein the stick mount is a recess in the first sun gear.

6. The planetary gear mechanism according to claim 4, wherein the position of the hole in the first carrier is axially aligned with a hole in the second carrier.

7. A planetary gear mechanism, comprising:
   a plurality of first planetary gears;
   an outer gear to mesh with the plurality of first planetary gears;
   a first sun gear coaxially disposed on the same axis as the outer gear, to transmit force to the first planetary gears;
   a first carrier to rotatably support the plurality of first planetary gears, the first carrier rotatably supported and including a hole through which a stick member penetrates in a direction of axis of rotation of the first carrier; and
   a stick mount on which the stick member penetrating through the hole is mounted, the stick mount disposed opposite the first carrier,
   wherein the outer gear is unrotatably held,
   wherein the stick member has a rounded rectangular shape in cross section, and the hole of the first carrier has a rounded rectangular shape to allow the stick member to fit therein.

8. A method for assembling a planetary gear mechanism, the planetary gear mechanism comprising:
   a plurality of planetary gears;
   an outer gear to mesh with the plurality of planetary gears;
   a sun gear to transmit force to the planetary gears, the sun gear coaxially disposed on the same axis as the outer gear;
   a carrier to rotatably support the plurality of planetary gears, the carrier rotatably supported and including a hole through which a stick member penetrates in a direction of axis of rotation of the carrier; and
   a stick mount on which the stick member penetrating through the hole is mounted, the stick mount disposed opposite the carrier,
   the outer gear is unrotatably held,
   wherein the hole is formed at the center of rotation of the first carrier, and the first sun gear includes the stick mount on a plane facing the first carrier in the axial center, and
   the stick member has a noncircular shape in cross section, and the hole of the first carrier has a noncircular shape to allow the stick member to fit therein
   the method comprising:
   inserting the stick member to the hole of the carrier;
   mounting the stick member at the stick mount;
   meshing the plurality of planetary gears with the sun gear and the outer gear by moving the carrier along the stick member, to mount the carrier in the outer gear; and
   removing the stick member after carrier is mounted.

* * * * *